United States Patent
Ragsdale et al.

(10) Patent No.: US 6,316,053 B1
(45) Date of Patent: Nov. 13, 2001

(54) INJECTOR/VALVE COMBINATION DESIGNED TO IMPROVE COLOR DOSING RESPONSE TIME

(75) Inventors: Mark E. Ragsdale, Duncan; Jimmy D. Chavis, Spartanburg; Frank Mark Pitman, Duncan, all of SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/606,261

(22) Filed: Jun. 29, 2000

Related U.S. Application Data

(63) Continuation of application No. 09/259,114, filed on Feb. 26, 1999, now Pat. No. 6,220,296.

(51) Int. Cl.[7] .................................................. B05D 5/00
(52) U.S. Cl. ................................................................ 427/244
(58) Field of Search ...................................... 427/243, 244; 137/625–647; 366/159.1, 181.6; 422/133; 118/302

(56) References Cited

U.S. PATENT DOCUMENTS

| | | | |
|---|---|---|---|
| 3,857,550 | 12/1974 | Knipp et al. | 259/4 |
| 4,223,811 | * 9/1980 | Czegledi . | |
| 5,445,187 | 8/1995 | Farquhar | 137/625.32 |
| 5,988,220 | 11/1999 | Sakaki | 137/625.47 |
| 5,998,220 | * 11/1999 | Sakaki . | |

OTHER PUBLICATIONS

Perry's Chemical Engineering Handbook, Sixth Edition, Robert H. Perry & Don Green, 1984, p. 2–22.*

* cited by examiner

Primary Examiner—Fred J. Parker
(74) Attorney, Agent, or Firm—Terry T. Moyer; William S. Parks

(57) ABSTRACT

This invention relates to an improved injector/valve combination which permits nearly immediate response time to an actuator signal. Such a combination is particularly suited for injecting colorants into polyurethane slabstock foam and permits a substantial reduction in foam waste due to low colorations during an on/off cycle. Specifically, this invention combination comprises a ball valve which allows for instantaneous shut-off and -on without appreciable leakage or pressure drop and without the need to utilize a high throughput flow rate. Such a ball valve is used in combination with an injector which is actually attached to the valve, the configuration which permits continuous use and instantaneous on/off without a deleterious pressure drop and minimizes the possibility of turbulence as the liquid polymeric colorant flows through the injector. The ball valve, the attached injector configuration, the coloring apparatus comprising the inventive ball valve and/or the attached injector configuration, and the slabstock foam colored through the utilization of such an apparatus are also contemplated within this invention.

8 Claims, 4 Drawing Sheets

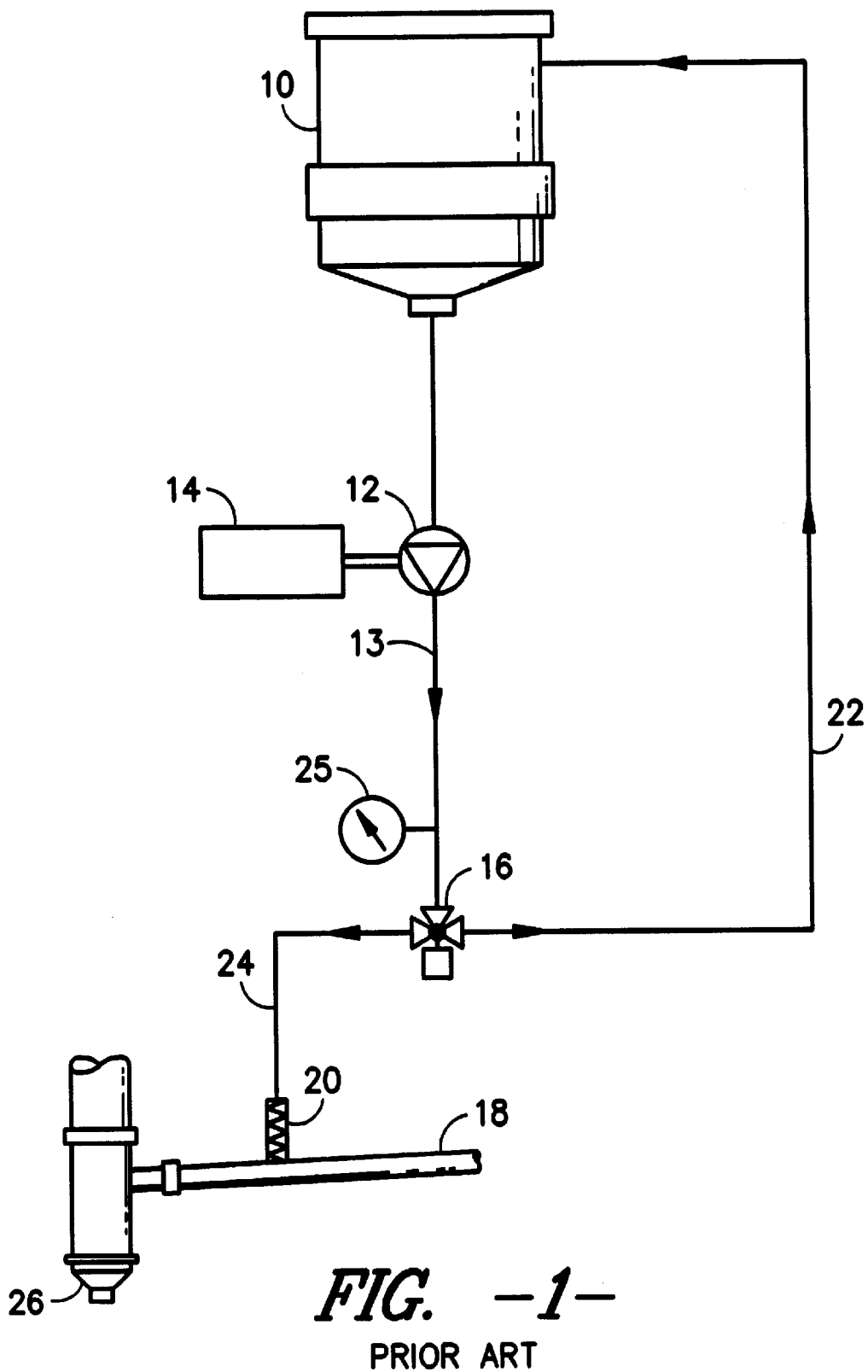
FIG. -1-
PRIOR ART

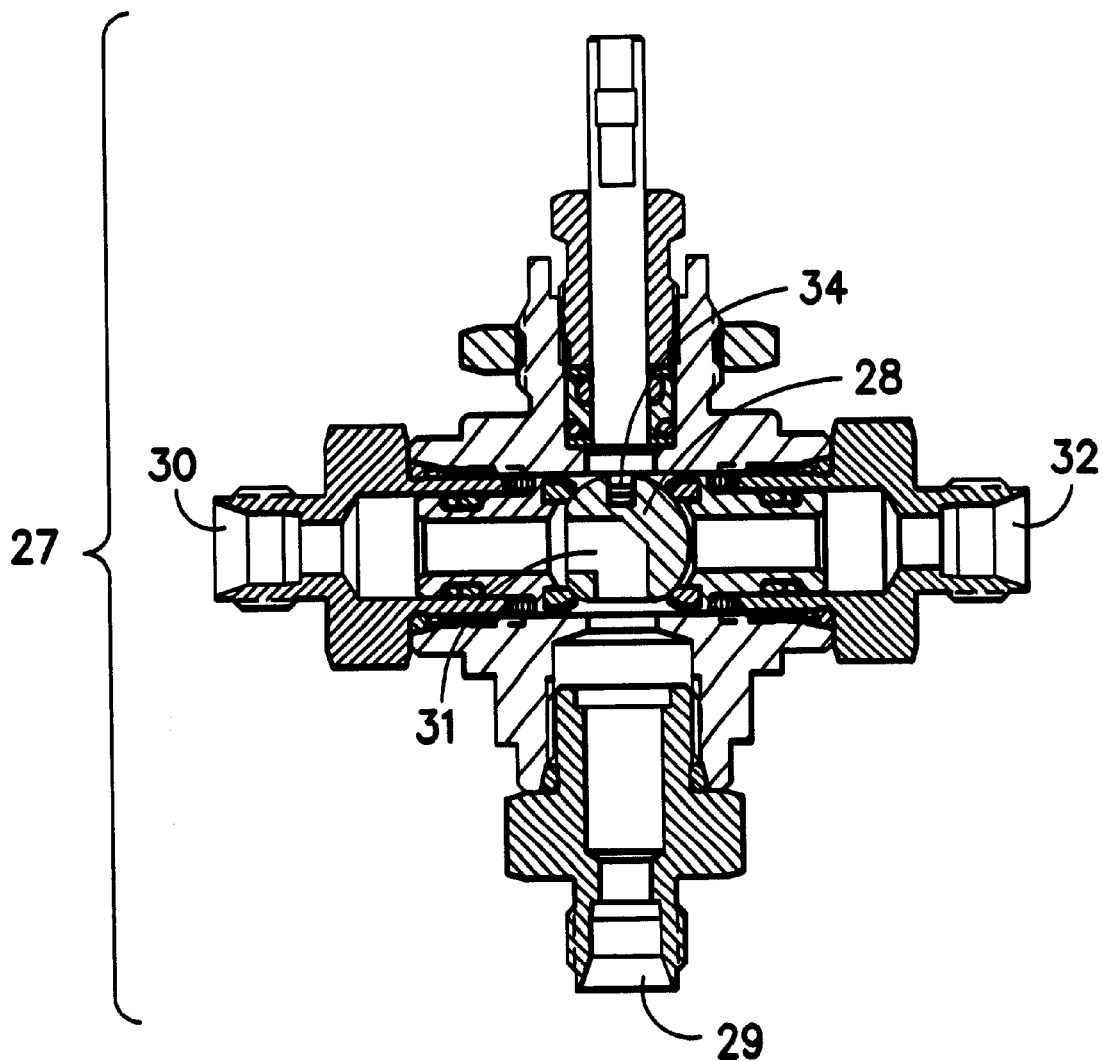
FIG. -2-
PRIOR ART

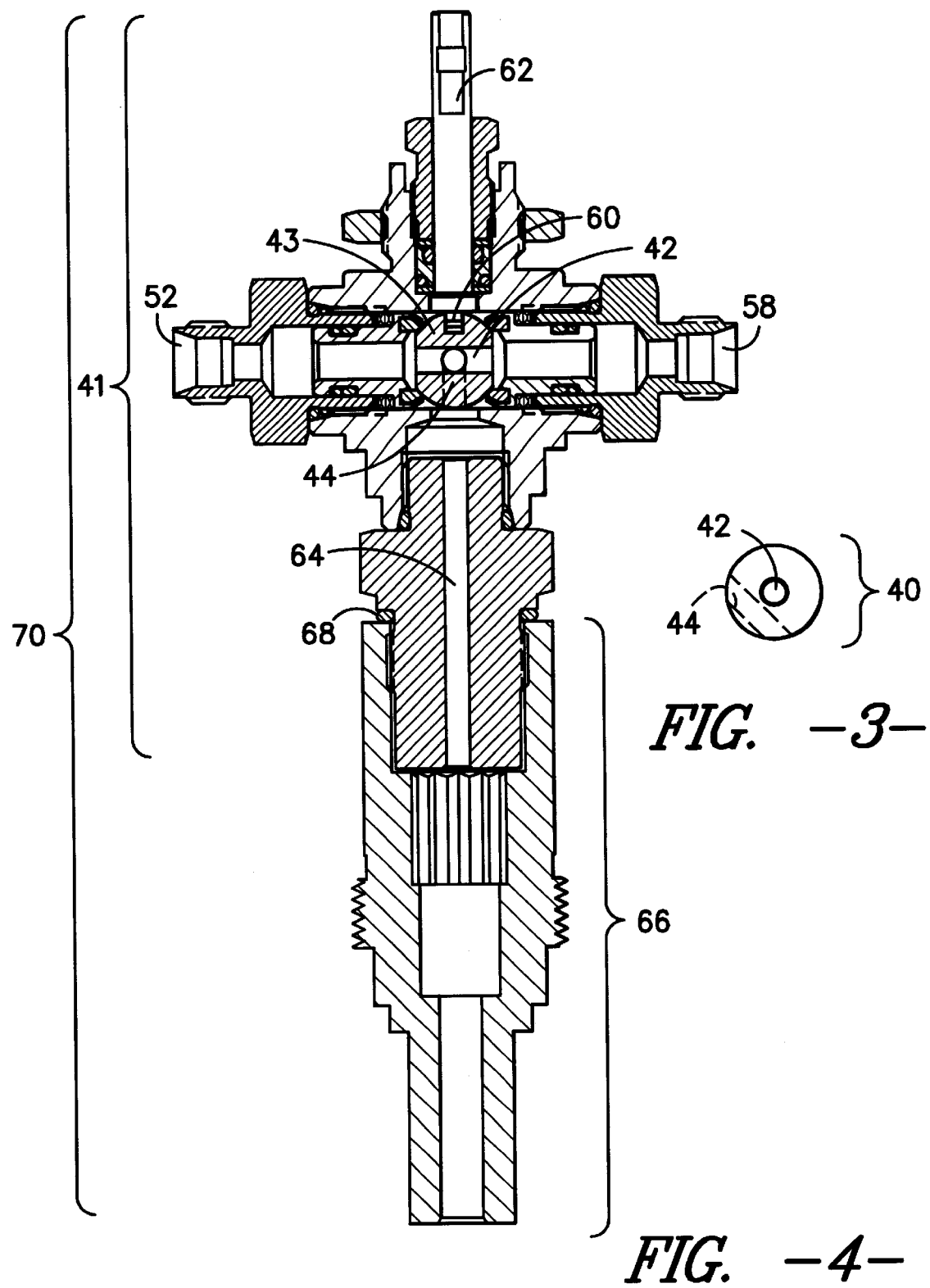
FIG. -3-
FIG. -4-

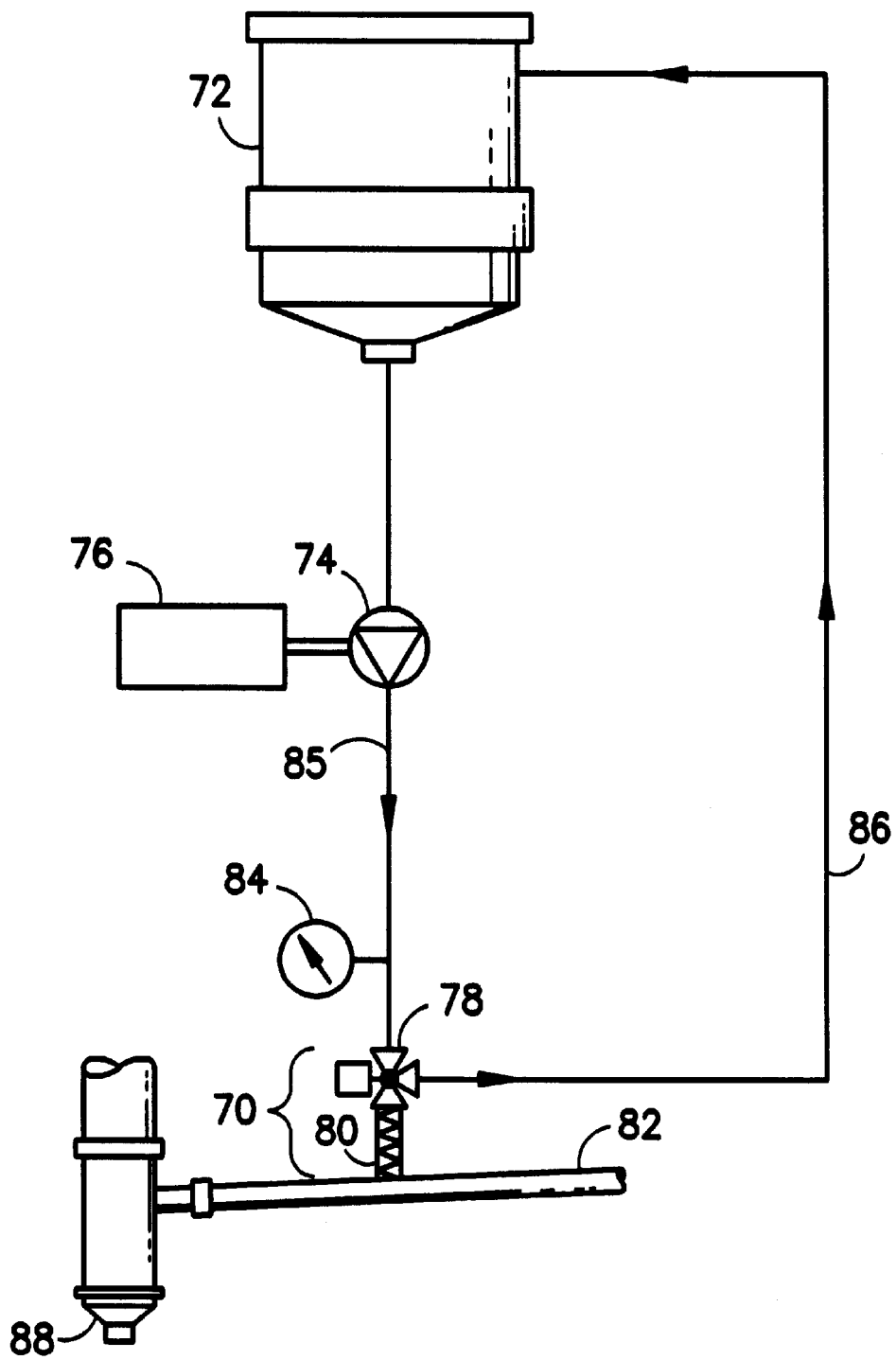
FIG. —5—

INJECTOR/VALVE COMBINATION DESIGNED TO IMPROVE COLOR DOSING RESPONSE TIME

CROSS REFERENCE TO RELATED APPLICATION

This application is a continuation of application 09/259,114, filed on Feb. 26, 1999, now U.S. Pat. No. 6,220,296. This parent application is herein entirely incorporated by reference.

FIELD OF THE INVENTION

This invention relates to an improved injector/valve combination which permits nearly immediate response time to an actuator signal. Such a combination is particularly suited for injecting colorants into polyurethane slabstock foam and permits a substantial reduction in foam waste due to low colorations during an on/off cycle. Specifically, this invention combination comprises a novel ball valve which allows for instantaneous shut-off and -on without appreciable leakage or pressure drop and without the need to utilize a high throughput flow rate. Such a ball valve is used in combination with an injector which is actually attached to the valve, the configuration which permits continuous use and instantaneous on/off without a deleterious pressure drop and minimizes the possibility of turbulence as the liquid polymeric colorant flows through the injector. The ball valve, the attached injector configuration, the coloring apparatus comprising the inventive ball valve and/or the attached injector configuration, and the slabstock foam colored through the utilization of such an apparatus are also contemplated within this invention.

The demand for a wide variety of colors in polyurethane slabstock foam has resulted in a significant move to blend-on-fly color dosing units based on the use of polymeric colorants. In this case color metering equipment is used to accurately dose two or more colors that are injected into the polyol stream and subsequently mixed in the foam mixhead to provide the correct shade and depth of color. The biggest advantage of this type of approach is that now an unlimited number of colors can be made from 4 or 5 "primary" colors. In addition, changes from one dark color to the next can usually accomplished in relatively short distances minimizing the amount of foam that must be scrapped as a result of the color change. Light shades have proven to be more of a challenge since the color throughput is substantially lower causing the response time to increase before changes actually made in the system can take effect. A means was needed to reduce this response time to an acceptable level thus minimizing the length of time required to change from one color to the next even at flow rates approaching 2 grams per minute or less. To do this it was necessary to design a unique 3-way valve/injector system that minimized the volume between the injection port and the recirculation line. This results in a rapid build up of pressure and hence almost instantaneous feed when switching from recirculation to dispense mode. In addition to rapid initiation of color flow it also required that flow be almost instantaneously interrupted even at high throughput when the color was switched from dispensing mode back to the recirculation mode. This is to prevent the "bleeding" of color back into the manifold when the need for color ends. The near immediate start and stop of color flow has been accomplished as a result of the current invention.

Polymeric colorants (i.e., polyoxyalkylenated colorants) such as those described in U.S. Pat. No. 4,284,729 to Cross et al., herein entirely incorporated by reference, have been used for a number of years to color polyurethane slabstock foam (i.e., in a continuous process). Prior to the utilization of such polymeric colorants, pigment dispersion were the main source of polyurethane coloring compounds. Such dispersions have traditionally proven very difficult to handle, too viscous for use within standard injectors, highly staining and thus difficult to clean from standard injector equipment (without the need for environmentally unfriendly solvents), and very abrasive and thus potentially damaging to the delicate machinery associated with coloring slabstock polyurethane foam. As a result, polymeric colorants are widely accepted as the best materials for coloring polyurethane foam.

In the past, custom blends of polymeric colorants were made ahead of time using two or more "primary" colors prior to incorporation within the target foam. The components would be mixed together using some type of agitation such as mixer or drum tumbler. Once the blend was of an appropriate shade it was transferred to a storage tank for further introduction within the foam substrate. Upon completion of coloring with a specific batch of polymeric colorant, the previously run color would have to be emptied from the storage tank; the tank would need to be cleaned; and then the next color to be run in the same tank would have to be charged in the tank. Cleaning of the tanks, pipelines, etc., was facilitated due to the water-solubility of the polymeric colorants (particularly as compared to pigments); however, the procedures followed were still considered labor intensive and not cost efficient. The general practice was then modified to maintain a dedicated tank for each separate color (shade) that was to run. This led to a number of inefficiencies and limitations that were not desirable if a foam manufacturer was to adequately meet demands in the market place.

Polymeric colorants such as those cited above in Cross et al. were designed to be totally miscible with one another as well as with most polyols, one of the two main ingredients used to produce polyurethane materials (isocyanates being the other). Pigment dispersions, on the other hand, are particulates dispersed in some type of liquid carrier. They require a high degree of agitation before they satisfactorily blend together to provide a uniform color. As a result the short amount of time that the polyol and colorant are mixed in the typical slabstock foam machine's mixhead is not sufficient to produce in an adequate mixture of components to insure a single, homogeneous coloration throughout the target foam. Thus, another modification was made permitting separate addition of desired polymeric colorants within a polyol manifold for subsequent blending as the polyol/isocyanate mixture passes through the mixhead. As a result, well over half of all the colored slabstock foam is produced in the United States through such a method.

A configuration of this new (now typical) polymeric colorant production line for slabstock foam is depicted in FIG. 1. This new coloring system itself generally consisted of 4 to 6 "primary" color storage tanks (one of which is depicted as 10 in FIG. 1) each feeding color to at least one positive displacement spur gear pump 12 coupled to a variable speed motor/drive 14 (such as available from Viking). The motor/pump combination 12, 14 was typically run continuously in either recirculation or dispense mode (depending on the position of a 3-way valve 16) to minimize the time required to spool up the motor 14 to the proper rpm and to ultimately achieve the pressure required to initiate color flow into a pre-mix manifold 18 through an injector 20. The throughput pressure was typically measured through the utilization of a pressure gauge 25 attached to the feed line 13 from the pump 12 to the 3-way valve 16. The typical 3-way valve 16 was air actuated and used to direct the flow of colorant from the recirculation feed line 22 to the dispense feed line 24 (to the injector 20) when color flow to the manifold 18 was required. From the manifold 18, the colorant(s) was moved to the mixing head 26 and then further on to color the target slabstock foam (not illustrated). Although this configuration has proven effective in the past, there remain a number of problems associated with this procedure which have heretofore been unresolved.

For instance, the market place demands that a foam producer be able to provide dark shades as well as light shades with a variety of hues and polyol flow rates. Since color is metered volumetrically a wide range of color flow rates are required to insure low enough flow for a minor component in a light shade. In addition, the polyol flow rates can be as low as 10 kg/min and as high as 300 kg/min [color loading is generally stated in parts per hundred polyol (php)]. As the rate at which the polyol flows is reduced so must the color rate be reduced to maintain the same php. For most foams manufactured in the United States the color delivery systems must be able to provide color flow as low a 2 grams/min and as high as 7000 grams/min or more. The rate at which color begins to flow when pumping 5000 grams/minute is generally very different than pumping 5 grams/min until the present invention is incorporated. Prior to this point the general approach was to use a smaller diameter line for the low flow range. Unfortunately, there are distinct limitations on such a small diameter (small bore) feed line, most notably the resultant throughput pressure drop from pumping material several feet through a small diameter line.

Furthermore, the typical polyurethane slabstock foam coloring system has a three-way air actuated ball valve (28 in FIG. 2) that is positioned up near the polyol manifold. Due to the configuration of the available ball valves they are generally located approximately 1 meter from the manifold. As provided by the representation of a standard three-way ball valve assembly in FIG. 2, material metered by the pump enters the top of the three-way ball valve 27 from the storage tank feed line 29 and exits either through the recirculation side 30 or the dispense side 32 depending on how the ball is oriented. FIG. 2 depicts the ball valve 27 when it is oriented in the recirculation mode. Once it is desired to change from recirculation to dispense and back to dispense the ball valve 28 must typically rotate 180° from one side of the valve to the other (although there are some apparati which utilize a 90° ball valve rotation) through the movement of an actuator (not illustrated) attached to an actuator pin 34 which, in turn, fits into an identation (not illustrated) within the ball valve 27. Furthermore, the typical ball valve 28 comprises a single channel 31 to accommodate the flow of colorant to either the recirculation side 30 or the dispense side 32. This single channel is configured at a right angle and thus may contribute to laminar flow problems by requiring the colorant liquid to radically change direction, thereby altering the pressure over the total liquid mass (and thus producing non-uniformity of pressures over the entire liquid colorant).

In addition to this 3-way valve, a device must be used to inject color away from the wall of the manifold to insure adequate subsequent mixing (i.e., to reduce the problems associated with laminar flow through a feed line having a larger diameter than the 3-way valve. Ideally, such a device should function as a check valve to maintain pressure in the line and to stop color flow when switching from dispense to recirculation. Such devices must maintain pressure after the dispensing unit is returned to recirculation mode otherwise the pressure drops below the "cracking" pressure of the check valve spring which will result in even longer startups which, in turn, may translate in to cost overruns or potentially greater amount of off-quality colored foam. Additionally, the resultant pressure drop must be acceptable across a broad delivery range for such injectors to alleviate any other related pressure difference problems.

An entire colorant pumping system (such as discussed with regard to FIG. 1, above) was developed to evaluate a variety of injection systems that closely resembles an actual production unit. It consisted of a spur gear pump from Viking coupled with a full flux vector motor and drive from Baldor. Stainless steel tubing having an outside diameter of ¼ inch was connected to the discharge side of the pump. The distance from the pump to the 3-way valve was approximately 40 feet. The distance from the standard 3-way valve to the check valve was 3 feet. The motor/pump was run to insure pressure up through the 3 way valve and then it was allowed to dispense to insure that fluid filled the line under pressure from the valve to the check valve. Measurements were then taken of the time required from the moment the 3-way valve is switched from recirculation to dispense and the time that a liquid polymeric colorant actually began to flow at various throughputs. Colorant response time (the time required for colorant to begin to flow from the three-way valve to the injector) was compared with throughput flow rate for this well known system. The results are tabulated below:

TABLE

| Colorant Response Time (seconds) | Flow rate (g/min) |
| --- | --- |
| 48 | 2.5 |
| 15 | 4 |
| 5 | 20 |
| 3 | 42 |
| 0 | 86 |

Thus, at low throughput flow rate, the time before delivery becomes excessive. It initially took 48 seconds from the time the valve was rotated until color began to flow at 2.5 grams per minute. This would represent almost 14 feet of off-quality foam generated with the conveyor speed of 17 feet per minute or a loss of up to 700 lbs of foam making chemical that would be disposed of as scrap. Obviously, an instantaneous delivery was needed for all flow rates which has not been accorded the industry by the prior art.

DESCRIPTION OF THE INVENTION

It is thus an object of the invention to provide a ball valve within a colorant injector apparatus which allows for instantaneous switching from a recirculating component to dosing to the injector without requiring a high throughput pressure. Another object of this invention is to provide an apparatus for coloring polyurethane slabstock foam which comprises a unitary injector/valve assembly. A further object of the invention is to provide a low throughput flow rate method of coloring polyurethane slabstock foam with a colorant injection which substantially reduces and possibly eliminates the production of off-quality, improperly colored waste foam materials. Another object of the invention is to provide a significant improvement in coloring polyurethane slabstock foam over the prior art through the utilization of a two-channeled ball valve which allows for instantaneous on/off performance at a very wide range of throughput pressures. Yet another object of this invention is to provide an injector/ valve assembly which substantially reduces the problems associated with laminar flow of liquid colorants or pigment dispersions in a coloring apparatus by permitting introduction of the colorant material away from the walls of the manifold thereby limiting the potential for deleterious turbulence (and thus potentially problematic resistance and pressure changes through the entire system).

Accordingly, this invention provides a spherical ball valve having first and second channels;

wherein each channel is exclusive of the other;

wherein said first channel has a first opening and a second opening, both of which are located at different locations on the spherical ball valve surface; and wherein said second channel has a first opening and a second opening, both of which are located at different locations on the spherical ball valve surface. Also, this invention provides for an injector/valve combination comprising such a spherical ball valve. Furthermore, this invention provides for an injector/valve combination wherein said valve comprises a ball valve and said injector is placed at a location within very close proximity to the valve. By the term "very close proximity" it is meant that the two components are attached, either permanently or temporarily, to each other (by a screw mechanism, for example), or that the two components are within at most about 12 inches away from each other. The greater the distance between the three-way valve and the injector, the greater potential for leak problems (which may result in off-quality foam production and undesirable pressure changes, as examples), as well as the greater possibility for longer colorant response times, as discussed above. Preferably, the valve and injector are combined in a unitary assembly. However, as noted above, relatively short spatial distances may be employed between these two components. In such instances, a pipe, which is preferably straight, must be utilized to connect the two components which itself must have the same bore size as the ball valve channel and the injector. Additionally, a method of coloring slabstock polyurethane foam utilizing a colorant apparatus comprising such an injector/valve combination as discussed above, and the resultant colored slabstock polyurethane foam are encompassed within the instant invention. The term "slabstock polyurethane foam" is a well known description of cured polyurethane foam, made from the reaction of polyols and isocyanates, which is uncolored and fed through a coloring apparatus in its bulky foamed state.

The instant invention solve the problems outlined above. A special 3-way valve was developed that comprises two exclusive channels that allows the valve to dispense from the bottom rather than feed from the bottom. In doing so the check valve was then connected directly to the bottom of the valve that would minimize the distance between the 3-way valve and manifold. In addition, a special "injector" was developed introducing color away from the wall of the manifold. This valve/injector configuration was tested in a similar manner as the standard configuration. The result was instantaneous flow regardless of the flow rate. In addition, due to the close proximity of the 3-way valve to the actual injection point, even if the injector leaked the volume is so small that it quickly filled again to the point that it would depress the injector spring (or bevelled washers) allowing instantaneous flow.

Thus, two very important discoveries have been made with this invention which permit a substantial reduction in waste of slabstock foam (thereby reducing costs to the end user and reducing the amount of environmentally unfriendly off-quality polyurethane foam entering landfills, and the like). First, the specific ball valve (which is a spherical ball valve) configuration discussed above facilitates an instantaneous on/off switching between a dispensing feed line to an injector unit and a feed line to a recirculation assembly (to reduce the amount of colorant potentially wasted and to best insure the throughput pressure of the entire apparatus remains uniform at all times). In particular, this ball valve comprises two exclusive channels, one of which is positioned to direct the flow of colorant to the recirculation assembly and the other to direct such a flow to the injector. This is accomplished by having the two separate channels be aligned on totally separate axes (for instance, one on the x-axis and the other on either the y- or z-axis). More specifically, the channel not on the x-axis must enter the spherical ball valve at a point referenced as 0° on the particular axis and exits the spherical ball valve at a point 90° on the same axis. In this manner, the two channels are completely exclusive of another, thereby facilitating movement of the valve between recirculation and dispensing modes. Furthermore, the configuration of the non-x-axis channel reduces the change of pressure on the liquid colorant through the valve than with a standard right angle bending channel (it provides a sort of shunt). Such a ball valve has proven to be invaluable in providing the necessary instantaneous on/off (color response) times as well as maintaining the proper flow rate (at an extremely wide range from about 0.3 g/min to about 14,000 g/min).

An actuator is utilized, generally, to rotate this ball valve into these specific positions. Such an actuator includes a pin extending into the valve assembly, the end of which pin is shaped to fit an indentation in the ball valve. The actuator then turns the ball valve the requisite number of degrees to align the respective channel to the desired feed line (90° is preferred, although, in some instances, 180° may be possible).

The second discovery with this invention has been that the valve assembly and injector unit can be moved in close proximity of one another in order to provide substantial reductions; in waste foam production as well. In fact, a unitary assembly of the valve and injector is preferred, particularly where the injector itself is positioned in direct contact with the manifold of the coloring apparatus. Such close proximity requirement is significant since the apparati known in this industry all have injectors which are spaced a considerable distance from the dosing valve. The prior art dosing valves basically perform the function feeding the colorant either to the injector or to the recirculation line; however, in all known instances, this three-way valve (from the colorant tank to either the injector or the recirculator), is necessarily positioned a great distance from the injector (about 3 feet on average) due to previously believed configuration problems. No other previously used or described ball valve permitted a trustworthy instantaneous on/off function in order to best guarantee off-quality foam would not be produced. Thus, the three-way valve and injector have traditionally always remained separated by a substantial length of flexible pipe. Although such an apparatus has proven to work well in the past, there has been no mechanism to reduce the amount of waste slabstock foam without resorting to the utilization of relatively high pressures or flow rates. For instance, color variations in the resultant foam products occur with regularity in the standard coloring assemblies when the pressure between the pump and the three-way valve is significantly increased in order to reduce colorant response time (the time required to move the colorant from the three-way valve to the manifold). This is caused by pressure differences between the area between the pump and the valve and the valve and the manifold and the fact that polymeric colorants exhibit slight degrees compressibility which are not properly accounted for in the standard slabstock foam coloring assemblies. Since such colorants may be transported to the valve at an abnormally high flow rate to the injector (while the dispense feed line has not been in use and thus may exhibit a lower amount of pressure), the overall colorant flow rate may oscillate to an abnormally low rate (to compensate for the pressure existing between the valve and the manifold) prior to its ultimate stabilization. This may require minutes of stabilization time which, again, may result in minutes worth of waste off-quality foam product. Furthermore, waste (off-quality) foam production has been caused by delayed colorant flow (throughput flow rate), pressure drop, and turbulence problems, as noted above, which themselves are attributed to varying bore sizes between the three-way valve, the colorant dispensing feed line (to the injector), and the injector within standard polyurethane slabstock foam coloring apparati. Additionally, the standard three-way valves utilize ball valves comprising single channels for directing colorants. In general, these channels are formed in such a way to require a right angle turn of the colorant liquid through the valve assembly either to the injector feed line or to the recirculator pipeline. Such a change of direction potentially increases the laminar flow problems associated with the movement of liquid colorants through feed lines (since the flow of discrete portions of the liquid material will not be substantially uniform) and can subsequently result in deleterious pressure changes which, again, can result in off-quality foam production.

The inventive ball valve and injector/valve assembly have provided a means to avoid all of these problems and potentially damaging circumstances, particularly where the bore size of the channels of the ball valve and the feed line through the injector and to the manifold are also substantially the same. Thus, the invention permits a substantial reduction (almost total elimination) of waste foam upon the utilization of very low, but highly desirable, flow rates and also allows for the utilization of an extremely wide range of flow rates without an appreciable pressure drop through the entire apparatus.

BRIEF DESCRIPTION OF THE DRAWINGS

FIG. 1 is a diagram of the prior art coloring procedure utilizing the preferred injector/valve combination and the prior art spherical ball valve.

FIG. 2 is a schematic cross section of the prior art three-way valve/injector combination.

FIG. 3 is a schematic cross section of the preferred spherical ball valve sliced through its y-axis.

FIG. 4 is a schematic cross section of the preferred injector/valve combination.

FIG. 5 is a diagram of the preferred coloring procedure utilizing the preferred injector/valve combination and the preferred spherical ball valve.

DETAILED DESCRIPTION OF THE DRAWINGS INCLUDING PREFERRED EMBODIMENTS

The spherical ball valve 40 of FIG. 3, which may be made from stainless steel preferably), titanium, carbon steel, and the like, comprises a first channel 42 which runs through the entire sphere on one single axis (the x-axis, for instance) and at a specific angle (such that the entire channel 42 is located at 0° on the x-axis). The ball valve 40 also comprises a second channel 44 which runs through the entire sphere on one single axis exclusive of the first channel 42 (here the y-axis although the z-axis is also possible) and at a specific angle (such that the channel 44 enters the ball valve 40 at a point at approximately 0° on the sphere in the y-axis and exits the ball valve 40 at a point 90° from the other entry but still in the same axis. Through this configuration, the first channel 42 permits flow of the liquid colorant (not illustrated) through the valve 40 to a recirculation feed line (58 of FIG. 4) when aligned with the inlet feed line (52 of FIG. 4) from a storage tank (72 of FIG. 5). Upon rotation of 90° by the utilization of an actuator pin (60 of FIG. 4) attached to an actuator (62 of FIG. 4) engaged with a properly shaped indentation (not illustrated) located at the point 270° on the y-axis in and of the ball valve 40, the first channel 42 is disengaged from all of its corresponding feed lines (52, 58 of FIG. 4) and permits the flow of liquid colorant (such as polymeric colorants, not illustrated) through the ball valve 40 (43 of FIG. 4) and into the dispensing feed line (64 of FIG. 4) via the other channel 44 oriented to permit passage of the liquid to the dispensing feed line (64 of FIG. 4) at a direction perpendicular to the inlet feed line (52 of FIG. 4). The bore of each channel 42, 44 is the same for each; however, the actual size of both bores in said channels 42, 44 may be of any size as long as they are the size as the bore of the inlet feed line (52 of FIG. 4), the recirculation feed line (58 of FIG. 4), and the dispensing feed line (64 of FIG. 4). The ball valve 40 (43 of FIG. 4) size is merely dependent upon the amount of space between all of the feed lines (52, 58, 64 of FIG. 4) within the entire valve assembly (41 of FIG. 4). The dispensing feed line (64 of FIG. 4) permits the flow of the liquid colorant (not illustrated) into the injector (66 of FIG. 4) which itself possesses the same size bore as the ball valve 40 and the feed lines (52, 58, 64 of FIG. 4). The injector (66 of FIG. 4) may be attached to the valve assembly 41 by way of a screw mechanism (not illustrated), in which case a straight screw (not illustrated) is preferably and beneficially utilized in conjunction with a rubber gasket (68 of FIG. 4) thereto attached. However, the injector (66 of FIG. 4) may also be welded, or the like, to the valve assembly 41 as well.

FIG. 5 thus incorporates the preferred injector/valve combination (70 of FIG. 4) into the entire slabstock foam coloring apparatus and procedure. The colorant is transported from a storage tank 72 to at least one positive displacement spur gear pump 74 coupled to a variable speed motor/drive 76 (such as available from Viking). The motor/pump combination 74, 76 is run continuously in either recirculation or dispense mode (depending on the position of the 3-way valve 78). In dispense mode, the colorant flows through the injector 80 into a pre-mix manifold 82. The throughput pressure is measured through the utilization of a pressure gauge 84 attached to the feed line 85 from the pump 74 to the 3-way valve 78. The 3-way valve 78 is actuated (although any other type of actuator may be used) and directs the flow of colorant from the recirculation feed line 86 or the dispense feed line (and thus to the injector 80) depending on whether color flow to the manifold 82 is desired. From the manifold 82, the colorant is moved to a mixing head 88 and then further on to color the target slabstock foam (not illustrated).

There are, of course, many alternative embodiments and modifications of the present invention which are intended to be included within the spirit and scope of the following claims.

What we claim is:

1. A method of coloring polyurethane slabstock foam comprising the steps of
   (a) providing a slabstock foam producing composition;
   (b) introducing a liquid colorant into a valve assembly including a ball valve, an inlet feed line, a dispensing feed line, and a recirculating feed line;
      wherein said ball valve has first and second channels;
      wherein each channel is exclusive of the other;
      wherein said first channel has a first opening and a second opening, both of which are located at different locations on the ball valve surface;
      wherein said second channel has a first opening and a second opening, both of which are located at different locations on the ball valve surface;
      wherein said inlet feed line transfers liquid into said valve assembly;
      wherein said valve assembly is oriented either to transfer liquid into said dispensing feed line or into said recirculation feed line; and
      wherein said recirculation feed line is oriented to transfer any liquid transferred thereto back to said inlet feed line;
   (c) introducing the liquid colorant from within the valve assembly of step "b" through said dispensing feed line into the slabstock foam producing composition of step "a".

2. The method of claim 1 wherein
   said ball valve of step "b" is a spherical ball valve comprising an x-axis, a y-axis, and a z-axis;
   wherein said first channel is located on said x-axis; and
   wherein said second channel is located on the yz plane.

3. The method of claim 2 wherein
   said spherical ball valve comprises a first opening of said first channel at a location of approximately 0° on said x-axis and a second opening at a location of approximately 180° on said x-axis; and
   wherein said first opening of said second channel is at a location on said y-axis and said second opening of said second channel is at a location on said z-axis.

4. The method of claim 3 wherein
   said first and second channels of said spherical ball valve are straight and have the substantially the same bore size.

5. The method of claim 1 wherein said liquid colorant is a polymeric colorant.

6. The method of claim 2 wherein said liquid colorant is a polymeric colorant.

7. The method of claim 3 wherein said liquid colorant is a polymeric colorant.

8. The method of claim 4 wherein said liquid colorant is a polymeric colorant.

* * * * *